United States Patent Office 3,135,800
Patented June 2, 1964

3,135,800
PREPARATION OF TETRAALKYLTETRAZENES
William R. McBride and Howard W. Kruse, China Lake, Calif., assignors to the United States of America as represented by the Secretary of the Navy
No Drawing. Filed Apr. 8, 1957, Ser. No. 651,558
2 Claims. (Cl. 260—583)
(Granted under Title 35, U.S. Code (1952), sec. 266)

The invention described herein may be manufactured and used by or for the Government of the United States of America for governmental purposes without the payment of any royalties thereon or therefor.

This invention relates to a new process for preparing tetra-substituted tetrazenes, and more particularly, to a process for preparing tetraalkyltetrazenes of the type formula $R_2NN=NNR_2$ wherein R is any alkyl group. It further relates to the new mixed unsymmetrical compounds $R_2NN=NNR_2$ wherein R is any aliphatic group. By the phrase "mixed unsymmetrical" is meant all cases except that in which the groups on the nitrogens are identical.

Tetraalkyltetrazenes of the type formula $R_2NN=NNR_2$ wherein R represents identical alkyl groups and of the type formula $R'RNN=NNRR'$ where R and R' are different alkyl groups have been previously prepared by the oxidation of the corresponding 1,1-dialkylhydrazines with mercuric oxide and other reagents in ether or water solution. Prior to the present invention, no process was available for the preparation of mixed unsymmetrical tetrazenes, of the type formula $R_2NN=NNR_2$ wherein R is any alkyl group.

It is an object of this invention to provide an economical process for the preparation of tetra-substituted tetrazenes.

It is another object of this invention to provide a method for preparing mixed unsymmetrical tetraalkyltetrazenes of the type formula $R_2NN=NNR_2$ wherein R is any alkyl group.

It has been found that tetraalkyltetrazenes of the type formula $R_2NN=NNR_2$ wherein R represents identical alkyl groups, and of the type formula $RR'NN=NNRR'$ wherein R and R' represents different alkyl groups, may be prepared by oxidizing the corresponding 1,1-dialkylhydrazines with halate salts, such as potassium iodate, potassium bromate or potassium chlorate, in acid solution to a 2-electron change followed by neutralization with a basic material to form the tetraalkyltetrazene by a coupling of unstable intermediate ions formed in the first step. The oxidation step may be carried out at a temperature from −20 to 50° C., preferably from −10 to 10° C. Additionally, the above compounds may be prepared by the use of other oxidants, such as, iodine, bromine and chlorine. Mixed unsymmetrical tetraalkyltetrazenes of the type formula $R_2NN=NNR_2$ wherein R is any alkyl group including different groups, may be prepared by oxidation of solutions of the corresponding hydrazines of the type $R_2NNH_2$ and $R'_2NNH_2$ wherein R and R' may be any alkyl group, carried out separately as above in acidic solution to a 2-electron change, mixing the solutions, and carefully neutralizing the final solution. The neutralization results in the formation of a mixture of tetra-substituted tetrazenes. The desired tetrazene may be separated by conventional separation means adapted to the properties of the particular tetrazene. For example, some of the tetrazenes, especially those containing higher alkyl groups are practically insoluble in water and may be removed by separation of the product layer from the water layer. They may also be separated from water by suitable solvent extraction or removal of the water by evaporation. The separation can also be accomplished by a fractional distillation under reduced pressure in a good column. Alternatively, tetraalkyltetrazenes of the type formula $R_2NN=NNR_2$ wherein R represents identical alkyl groups, and of the type formula $RR'NN=NNRR'$ wherein R and R' represent different alkyl groups, may be prepared directly by oxidation of the corresponding 1,1-dialkylhydrazine with one of the members of the halogen family in neutral or slightly basic aqueous solutions.

The operation of the invention is best illustrated by the following examples which are illustrative of the invention but not limiting thereof.

EXAMPLE 1

60 ml. of a solution 6 N in hydrochloric acid containing 0.0392 g. of 1,1-dimethylhydrazine was cooled and maintained at a temperature from 0 to 5° C. while 0.1 N potassium bromate was added dropwise. The volume of potassium bromate required for the potentiometric titration was 13.11 ml. for two equivalents of oxidant (theory 13.04 ml.). The resulting solution was diluted to 100 ml. and kept at 0° C. A 5-ml. aliquot was removed from this standard solution, diluted to 100 ml. and immediately scanned in the ultraviolet region between 3500 and 2000 A. An additional aliquot was removed from the standard solution, adjusted to a pH of about 11 with an ice-cold sodium hydroxide solution, and diluted to 100 ml. This solution was scanned in a similar fashion as before. A 50-ml. aliquot was withdrawn from this latter solution, the pH adjusted to about 1, subsequently diluted to 100 ml. and the solution scanned as before. The original solution of 1,1-dimethylhydrazine in hydrochloric acid freshly oxidized with potassium bromate did not exhibit the absorption at 2360 A. characteristic of tetramethyltetrazene. However, tetramethyltetrazene was formed in 87% yield by the careful neutralization at low temperature; its reacidified solution exhibited the characteristic absorption at 2360 A. No tetramethyltetrazene was present in the first case. The conversion to tetramethyltetrazene in the second case was 87% and conversions from a series of such experiments were as high as 97%.

EXAMPLE 2

3 moles of 1,1-dimethylhydrazine were added slowly to 4.60 moles of 37% hydrochloric acid (12.2 N) at about 0° C. To the resultant solution 1.00 mole of potassium bromate was added as a solid in small amounts while maintaining the temperature between 0 and 10° C. A few minutes after the addition was complete, the solution was neutralized with 4.75 mole of sodium hydroxide solution (10.0 N). The total volume of reactants was slightly more than 1 liter. During the reaction, ice was added to the solution so that the final volume was between 2.5 and 2.8 liters. The optimum time elapsed for carrying out the steps of the preparation was usually 45 minutes. The yield of tetramethyltetrazene recovered was 130–150 g. (75–86% based on the consumption of the oxidant). The process was found to provide equivalent yields using 5–10% excess of 1,1-dimethylhydrazine.

EXAMPLE 3

An unsymmetrical mixed tetrazene, 1,1-diethyl-4,4-dimethyltetrazene, was prepared in a mixture with tetramethyltetrazene and tetraethyltetrazene by the separate oxidation of equimolar quantities of 1,1-dimethylhydrazine and 1,1-diethylhydrazine using potassium bromate as the oxidant. Each dialkylhydrazine was oxidized separately to a 2-electron change in hydrochloric acid solution at around 0° C. The solutions were then mixed and carefully neutralized with a solution of sodium hydroxide to bring about coupling of the diazo-like intermediates. Separation of the resulting mixture gave tetramethyltetrazene, tetraethyltetrazene, and 1,1-diethyl-4,4-dimethyltetrazene in proportions which indicated random coupling of the diazo-like intermediates which are first formed in the oxidation to a 2-electron change.

Although the invention for the production of tetraalkyltetrazenes in which the alkyl substituents are lower alkyl groups, is illustrated by the above examples, it is not limited thereto as it is equally applicable to the production of tetraalkyltetrazenes in which the alkyl substituents include higher alkyl groups, such as, those having twenty or more carbon atoms. Likewise, the substituted groups are not limited to saturated aliphatic groups but include unsaturated aliphatic groups, such as, vinyl, allyl, etc. The oxidants are not limited to halates of potassium but include halates of the other alkali metals; halate salts of other metals may be used. The acid used for the oxidation medium is not limited to hydrochloric but includes other conventional acids used to control pH values, such as, sulphuric. The base for controlling the alkalinity of the solution is not limited to sodium hydroxide as other standard alkalinity agents may be used, such as, other alkali metal hydroxides, alkaline earth metal hydroxides, carbonates, and oxides. The pH value of the medium in which the diazo-like intermediates are coupled to form the tetrazenes may vary from about 3 or 4 to 11.

Identification of the products formed is illustrated by the spectrophotometric process used for identifying tetramethyltetrazene with a Cary Model 11 MS recording spectrophotometer using 1-cm. cells. A 0.0759 g. sample of tetramethyltetrazene was dissolved in an aqueous solution and the pH of the solution adjusted to approximately 11 by the addition of 2 ml. of 0.1 N sodium hydroxide. The solution was then diluted to 100 ml. To suitable aliquots (1–5 ml.) were added 2 ml. of 0.1 N sodium hydroxide and the solution diluted to 100 ml.; the resulting solution was scanned in the region of 3500 to 2000 A. The molar absorbancy indexes, $a_M$, for the two peaks of maximum absorption in the ultraviolet at 2480 and 2770 A. are approximately, respectively, 5280 and 7156 in units of 1000 cm.$^2$/mole. In acidic solution, the conjugate acid of tetramethyltetrazene exhibits a maximum absorption at 2360 A. ($a_M$=8920). The tetraalkyltetrazenes formed in the examples included herein were determined quantitatively in basic solution by spectrophotometric procedures utilizing the absorption of these compounds at approximately 2480 and 2770 A. In acidic solution the conjugate acid of the tetrazenes exhibits maximum absorption at approximately 2360 A. as evidenced with tetramethyltetrazene. This dependence of the absorption on pH allows a rapid determination of the $pK_b$ of the respective tetraalkyltetrazenes.

The reaction of oxidation of the 1,1-dialkylhydrazines to tetraalkyltetrazenes with alkali halates in acid solution with the formation of the unstable intermediate takes place as follows:

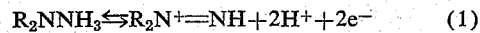

$$R_2NNH_3 \rightleftharpoons R_2N^+ = NH + 2H^+ + 2e^- \quad (1)$$

$$R_2N^+ = NH + OH^- \rightleftharpoons R_2N^+ = N^- + H_2O \quad (2)$$

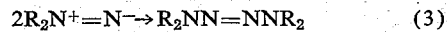

$$2R_2N^+ = N^- \rightarrow R_2NN = NNR_2 \quad (3)$$

Equation 1 represents the half reaction for the reversible oxidation of 1,1-dialkylhydrazines in acid solution to form the stabilized conjugate acid of the diazo-like compound whose basic form lacks suitable resonance stability as indicated in Equation 2 and immediately couples in an irreversible manner to form the tetraalkyltetrazene, Equation 3. These equations illustrate the mode of formation of mixed unsymmetrical tetrazenes such as 1,1-diethyl-4,4-dimethyl-tetrazene through the technique of separately oxidizing the corresponding 1,1-dialkylhydrazines in acid solution, mixing the solutions, and coupling through neutralization.

The above series of reactions was verified by experiment. In acidic solution at low temperatures the potentiometric titration of 1,1-dialkylhydrazines is stoichiometric and requires two equivalents of either potassium bromate or iodate. Although tetramethyltetrazene might be the expected oxidation product, a solution of 1,1-dimethylhydrazine in hydrochloric acid freshly oxidized with potassium bromate at 0° C. does not exhibit the absorption at 2360 A. characteristic of tetramethyltetrazene. If, however, the acidic solution is carefully neutralized at low temperatures, tetramethyltetrazene is formed in nearly quantitative amounts; its reacidified solution now exhibits the characteristic absorption at 2360 A.

The tetraalkyltetrazenes, other than those of the type formula $R_2NN=NNR'_2$, may be prepared by the oxidation of 1,1-dialkylhydrazines with one of the members of the halogen family in neutral or slightly basic aqueous solutions. This feature of the invention is illustrated by the following examples which are illustrative but not limiting of the invention.

EXAMPLE 4

To 40 ml. of solution which was 0.02 N in hydrochloric acid concentration and contained 0.0416 g. of 1,1-dimethylhydrazine was added 0.5–1.0 g. of magnesium hydroxide. While the solution was maintained at 0–5° C. and blanketed with nitrogen, 0.0818 N iodine solution was added dropwise. The end point could be detected either with or without the addition of starch indicator. The required volume of titrant was 17.15 ml. (theory for a 2-electron change, 16.91 ml.). The final solution was diluted to 100 ml. (pH 9.63) and a 5-ml. aliquot withdrawn from a centrifuged sample of the solution. The aliquot was treated with 2 ml. of 0.1 N sodium hydroxide and diluted to 100 ml. The corrected absorbancy values at 2770 A. for two analyses were 1.240 and 1.237 (theory 1.239). Similar results were obtained when oxidations with iodine were performed in the presence of excess calcium carbonate. In experiments with bromine and chlorine solutions, the optimum conversions to tetramethyltetrazene were 97 and 47%, respectively. In addition to spectrophotometric identification, the tetramethyltetrazene formed in the halogen oxidations was characterized by comparison of the melting points and X-ray powder patterns of the picrate derivatives with an authentic picrate derivative of tetramethyltetrazene.

EXAMPLE 5

Tetramethyltetrazene was prepared by oxidation of 1,1-dimethylhydrazine to a 2-electron change with a solution of iodine in potassium iodide at a temperature of around 0 to 1° C. The solution was maintained at a pH of 7 by addition of excess calcium carbonate. The yield of tetramethyltetrazene determined by the method described above was 98.9 to 99.6%. Similar results were obtained when the preparation was carried out in a solution containing excess magnesium hydroxide at a pH of around 9.6.

Tetramethyltetrazene was also prepared in the above manner of oxidation of 1,1-dimethylhydrazine with bromine and with chlorine. Calcium carbonate was used in these experiments to maintain the solution near neutral. The yield with bromine as oxidant was 95.5%. In several experiments in which magnesium hydroxide was used the yield was 95.4 to 96.2%. The use of chlorine as oxidant in general gave lower conversions. Spectrophotometric analysis indicated that yields with chlorine were around 47%.

EXAMPLE 6

Tetraethyltetrazene was prepared by the oxidation of 1,1-diethylhydrazine with iodine at around 0° C. in a solution containing calcium carbonate. The conversions as indicated by spectrophotometric analysis were around 95%.

Tetramethyltetrazene, tetraethyltetrazene, 1,4-dimethyl-1,4-diisopropyltetrazene, tetra-n-propyltetrazene, and tetra-n-butyltetrazene were prepared by oxidation reactions in 6 N hydrochloric acid solution using as oxidants potassium iodate and potassium bromate. The corresponding 1,1-dialkylhydrazines were oxidized to a 2-electron change at about 0° C. The solutions were carefully neutralized with alkali to couple the diazo-like intermediates which were first produced. The aqueous solutions were extracted with ether and the products purified by vacuum distillation from a drying agent such as barium oxide. The yield of pure compound recovered varied from 60 to 90%. The chlorates of the alkali metals may also be used as oxidants in acid solutions with somewhat smaller yields.

The chemical reaction which produces the intermediate species in the above type reactions is due entirely to the oxidizing properties of the halate ion in the acidic medium. The positive ion is not important to the success of the process. For example, alkaline earth metal halates may be used instead of alkali metal halates with substantially equal success.

The tetraalkyltetrazenes of this invention were found to be useful as fuels for jet actuated devices and as additives to conventional fuels for these devices. One of their chief functions as additives to fuels is to act as ignition and combustion promoters. For example, a fuel can be rendered spontaneously ignitable with fuming nitric acid when mixed with a tetralkyltetrazene. This latter property is highly important in rocket applications wherein fuming nitro acid is used as the oxidizing agent for the fuel in that the problem of combustion instability is significantly reduced. When used as an additive to a fuel to be oxidized by red fuming nitric acid or by oxygen in an air breathing system, the liquid compounds are mixed in appropriate amounts with the fuel.

The following data taken chiefly from warming curves for binary fuel systems including a typical tetraalkyltetrazene, tetramethyltetrazene, shows that the compounds are adaptable to produce binary fuel systems which meet the low-freezing-point specification of jet fuels.

*Table I*

FREEZING POINTS OF THE SYSTEM TETRAMETHYL-TETRAZENE-JP-4

| JP—4, wt. percent: | Melting point, ° C. |
|---|---|
| 00.00 | −21.97 |
| 9.97 | −24.69 |
| 18.26 | −26.75 |
| 25.03 | −28.49 |
| 30.85 | −30.00 |
| 36.53 | −31.23 |
| 43.24 | −33.00 |
| 49.11 | −34.54 |
| 59.48 | −37.80 |
| 69.87 | −42.06 |

*Table II*

FREEZING POINTS OF THE SYSTEM TETRAMETHYL-TETRAZENE-1,1-DIMETHYLHYDRAZINE

| DMH, mole percent: | Melting point, ° C. |
|---|---|
| 0.00 | −21.97 |
| 12.53 | −26.17 |
| 24.73 | −29.86 |
| 35.51 | −32.80 |
| 43.00 | −34.90 |
| 53.02 | −38.00 |
| 59.06 | −40.31 |
| 59.46 | −40.00 |
| 63.85 | −42.00 |
| 77.55 | −47.56 |
| 83.71 | −52.79 |
| 89.00 | a −61.39 |
| 91.08 | −63.00 |
| 92.15 | −62.16 |
| 95.97 | −60.80 |
| 97.94 | −60.03 |
| 100.00 | −57.2 | a Eutectic at −63.2° C. at 91.0 mole-percent DMH.

*Table III*

FREEZING POINTS OF THE SYSTEM TETRAMETHYL-TETRAZENE-METHYLHYDRAZINE

| MH, mole percent: | Melting point, ° C. |
|---|---|
| 0.00 | −21.97 |
| 38.30 | −27.69 |
| 51.25 | −28.57 |
| 67.00 | −29.94 |
| 78.40 | −31.88 |
| 80.40 | −32.54 |
| 86.28 | −35.37 |
| 95.78 | −50.00 |
| 98.69 | −53.39 |
| 100.00 | −53.14 |

*Table IV*

FREEZING POINTS OF THE SYSTEM TETRAMETHYL-TETRAZENE-DIETHYLENETRIAMINE

| DETA, mole percent: | Melting point, ° C. |
|---|---|
| 0.00 | −21.97 |
| 14.50 | −24.37 |
| 25.16 | −25.37 |
| 38.37 | −25.83 |
| 55.09 | −26.61 |
| 65.20 | −27.57 |
| 73.39 | −28.68 |

Comparative ignition data of typical tetraalkyltetrazenes and 1,1-dialkylhydrazines indicate the tetrazenes have favorable ignition properties.

A comparison of related tetraalkyltetrazenes and 1,1-dialkylhydrazines with IRFNA, anhydrous perchloric acid ($HClO_4$), and perchloryl fluoride ($ClO_3F$) reflects remarkable similarities and certain intrinsic differences in their ignition properties. The similarities between these two classes of compounds are evident from a comparison of the ignition delay of the tetraalkyltetrazenes and the 1,1-dialkylhydrazines with IRFNA and $HClO_4$ (Table V). The data for the ignition delays were obtained by the Open Cup Method; a correction of 1–2 ms. should be subtracted from the data.

*Table V*

IGNITION DATA FOR 1,1-DIALKYLHYDRAZINES AND TETRAALKYLTETRAZENES

| Compound | Ignition Delay,a ms. | |
|---|---|---|
| | IRFNAb | $HClO_4$ |
| Hydrazine: | | |
| 1,1-Dimethyl- | 3.0 | 4.2 |
| 1,1-Diethyl- | 1.3 | 4.8 |
| 1-Isopropyl-1-methyl- | 1.4 | 3.9 |
| 1,1-Di-n-propyl- | 2.2 | 4.5 |
| 1,1-Di-n-butyl- | 6.6 | 4.2 |
| Tetrazene: | | |
| Tetramethyl- | c 4.2 | 1.6 |
| Tetraethyl- | 12.1 | 2.8 |
| 1,4-Diisopropyl-1,4-Dimethyl- | 13.0 | 2.3 |
| Tetra-n-propyl- | 25.7 | 4.0 |
| Tetra-n-butyl- | 54.3 | 7.1 | a Correction of 1–2 ms. to be subtracted from mean values.
b IRFNA (20% $NO_2$).
c Data for tetramethyltetrazene obtained at a later date gave a mean value of 8.6 ms. (uncorr.), while control runs with 1,1-dimethylhydrazine remained the same.

No significant trend is indicated by the ignition delays with 1,1 - dialkylhydrazines. However, with the tetraalkyltetrazenes, a significant trend is noted for at least the nitric acid and perhaps for the perchloric acid. Ignition data for several systems of JP–4 with either tetramethyltetrazene or 1,1-dimethylhydrazine are given in Table VI. With low amounts of either constituent as additive to JP-4, the systems were non-hypergolic with IRFNA (14% $NO_2$). Little difference was noted between 14 and 20% $NO_2$ for the 60 wt. percent JP-4 and 40% 1,1-dimethylhydrazine system.

Table VI

IGNITION DATA FOR SEVERAL JP-FUEL SYSTEMS

| System | Ignition Delay,[a] ms. | Comments [b] |
|---|---|---|
| Tetramethyltetrazene: | | |
| 80% JP-4 | No values | $NO_2$ evolved. |
| 60% JP-4 | 36.8, 38.6, 44.4 | yellow flame. |
| 40% JP-4 | 24.9, 30.0, 21.7, 26.1, 28.4, 26.1. | yellow air flame. |
| 1,1-Diethylhydrazine: | | |
| 80% JP-4 | 47.2, 226.0, No value | $NO_2$ evolved. |
| 60% JP-4 | 15.2, 20.3, 19.9 | |
| 60% JP-4 | 19.4, 14.8, 18.4 | 20% $NO_2$ used. |
| JP-X (Authentic) | 13.2, 13.5, 14.1 | Do. |
| Tetramethyltetrazene: | | |
| 60% $CH_3NO_2$ | 26.4, 36.7, 26.2 | all ignitions different. |
| 40% $CH_3NO_2$ | 18.4, 15.6 | |

[a] Correction of 1–2 ms. to be subtracted from all data.
[b] With exceptions noted all data with IRFNA (14% $NO_2$)

The unusual differences between tetramethyltetrazene and 1,1-dimethylhydrazine are most evident from their ignition delay data with perchloryl fluoride. Experiments have shown that tetramethyltetrazene with perchloryl fluoride in the open-cup test ignites satisfactory; under comparable conditions no ignition or detonation occurred with 1,1-dimethylhydrazine. Tetramethyltetrazene ignited in either an oxidizer- or a fuel-rich system; 1,1-dimethylhydrazine merely evolved copious white fumes, presumably hydrofluoric acid. Tetramethylhydrazine under these conditions was inert. The characteristic ignition properties of tetramethyltetrazene with perchloryl fluoride are attributed to the relative instability of tetraalkyltetrazenes with mineral or Lewis acids and to a unique relationship between the fluorine-containing oxidizer and the tetrazene structure of the fuel.

Comparative performance data, including theoretical specific impulse and static tests, for a typical tetraalkyltetrazene and 1,1-dimethylhydrazine, indicates that the tetraalkyltetrazenes give satisfactory performance as fuels.

The comparison of the performance of related tetraalkyltetrazenes and 1,1-dialkylhydrazines has been limited to their respective methyl homologues, tetramethyltetrazene and 1,1-dimethylhydrazine. The criteria used are based upon theoretical specific impulse, $I_{sp}$, and the data from 3 static firings in a small motor L* of 20 in.

The theoretical specific impulse of tetramethyltetrazene and 1,1-dimethylhydrazine with IRFNA (20% $NO_2$) is given in Table VII.

Table VII

THEORETICAL SPECIFIC IMPULSE FOR TETRAMETHYLTETRAZENE [a]

| Compound | r | Specific Impulse (eq.) | | $T_o$ [b] | C* [c] |
|---|---|---|---|---|---|
| | | 300 p.s.i. | 1,800 p.s.i. | | |
| 1,1-Dimethylhydrazine | 2.94 | 246 | 290 | 3,150 | 5,602 |
| Tetramethyltetrazene: | | | | | |
| 40 kcal | 2.61 | 257 | 303 | 3,441 | 5,870 |
| 80 kcal | 2.61 | 251 | 296 | 3,315 | 5,712 |
| 100 kcal | 2.61 | 247 | 291 | 3,252 | 5,633 |

[a] Calculations assume use of IRFNA (20% $NO_2$) with formation of equimolar amounts of CO and $CO_2$. All nitrogen present as $N_2$ and hydrogen as $H_2O$.
[b] Chamber temperature, °K.
[c] Characteristic exhaust velocity, ft./sec.

The data for 3 preliminary static firings in the small motor are given in Table VIII.

Table VIII

STATIC TEST DATA FOR TETRAMETHYLTETRAZENE WITH IRFNA (20% $NO_2$)

| Run | r | C* | $P_c$ | $I_{sp}$ |
|---|---|---|---|---|
| 1,1-Dimethylhydrazine: | | | | |
| PEM 191 | 2.80 | 5,310 | 1,505 | 269 |
| PEM 192 | 2.81 | 5,230 | 1,510 | 265 |
| Tetramethyltetrazene: | | | | |
| PEM 196 | 2.57 | 5,070 | 1,495 | 257 |
| PEM 197 [a] | 2.33 | 5,110 | 1,470 | 259 |
| PEM 198 | 2.48 | 5,270 | 1,405 | 267 |

[a] 16-mm. color film was obtained on this run.

It is seen from the above results that the compounds prepared by the process of the invention have utility as fuels and fuel additives. Obviously, many modifications and variations of the present invention are possible in the light of the above teachings. It is therefore to be understood that within the scope of the appended claims the invention may be practiced otherwise than as specifically described.

What is claimed is:

1. The process of making tetraalkyltetrazenes which comprises reacting 1,1-dialkylhydrazines with halogens in a neutral to moderately basic solution, at temperatures in the range of about −20° to 50° C.

2. The process of making tetraalkyltetrazenes which comprises reacting 1,1-dialkylhydrazines with cations selected from the group consisting of cations of chloric, bromic, and iodic acids in acidic solution to a 2-electron change at temperatures in the range of about −20° to 50° C., and making the solution basic to form the tetrarene.

References Cited in the file of this patent

Beilstein, Handbuch der Organischen Chemie, 4th Ed. 1st supplement, Deutsche Chemischen Gesellschaft, Berlin (1929), vol. 4, p. 570.

Hantzsch et al.: Berichte, 45, p. 3020.